Aug. 31, 1937.  L. W. DAENBA  2,091,777
FRUIT AND VEGETABLE PITTER AND PARER
Filed Dec. 12, 1936
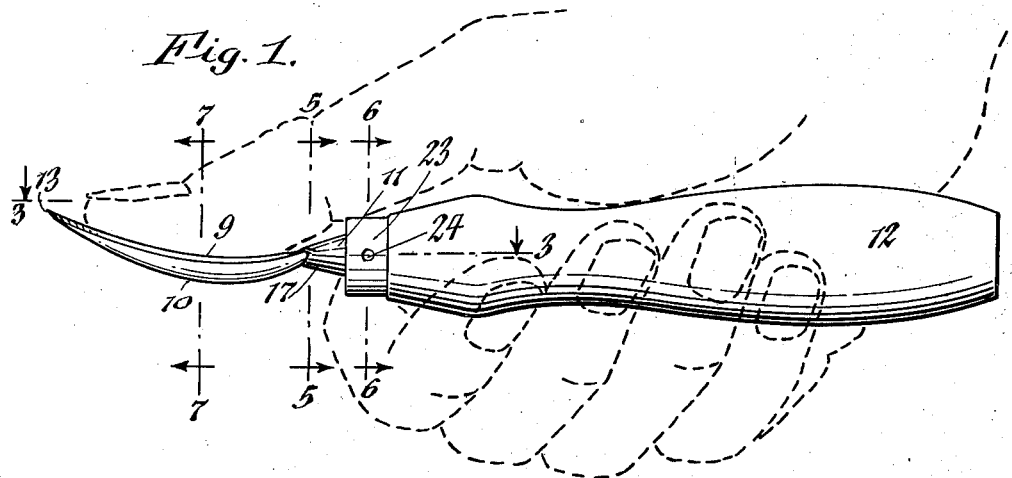
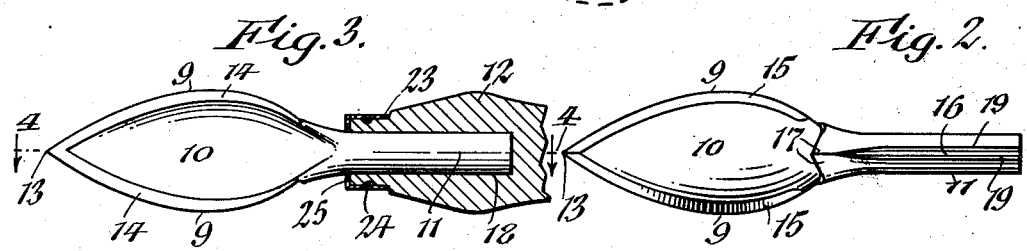
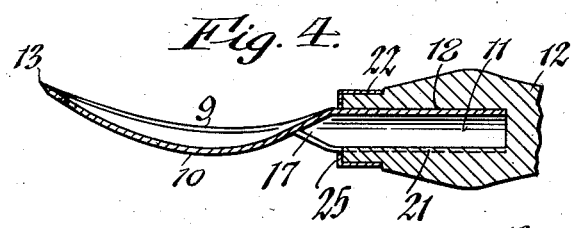
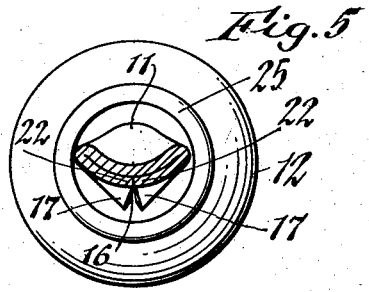
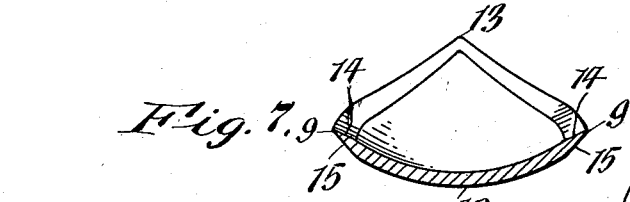
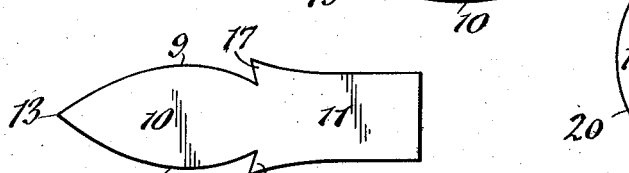
INVENTOR
Lawrence W. Daenba
BY Popp & Popp
ATTORNEYS Patented Aug. 31, 1937

2,091,777

UNITED STATES PATENT OFFICE 2,091,777

FRUIT AND VEGETABLE PITTER AND PARER

Lawrence W. Daenba, Attica, N. Y.

Application December 12, 1936, Serial No. 115,603

1 Claim. (Cl. 30—340)

This invention relates to a fruit or vegetable pitter or parer for use in peeling skins from tomatoes, apples, potatoes or the like and gauging the eyes of potatoes, the pits of pineapples, removing the spots of apples and similar operations on fruits and vegetables preparatory to cooking or serving the same.

It is the purpose of this invention to provide a manually operable implement of this character which is of simple, durable and inexpensive construction and permits of efficiently pitting and paring fruits and vegetables of various kinds with ease and convenience and without liability of injuring or chafing the hands of the operator.

In the accompanying drawing:—

Fig. 1 is a side elevation of an implement embodying this invention.

Fig. 2 is a bottom plan view of the scoop and shank of the implement.

Fig. 3 is a horizontal section, taken on line 3—3, Fig. 1.

Fig. 4 is a vertical longitudinal section, taken on the correspondingly numbered line in Fig. 3.

Figs. 5, 6, and 7 are vertical transverse sections, taken respectively on lines 5—5, 6—6 and 7—7 in Fig. 1.

Fig. 8 is a plan view of the blank from which the scoop and shank of this implement are constructed.

In the following description similar characters of reference indicate like parts in the several figures of the drawing.

In its complete form this implement comprises a scoop or bowl 10 for engagement with the material to be operated upon, an attaching shank 11 arranged on the scoop and a handle 12 connected with the shank for manipulating the implement.

The scoop is constructed from a sheet of metal which is stamped so that the same is generally of downwardly dished spherical form and elongated so that its opposite longitudinal sides 9 are curved outwardly intermediate of the length of the scoop and converge forwardly so as to terminate in a forwardly projecting point 13, as shown in Figs. 2 and 3.

The longitudinal edge portions of the scoop are curved downwardly and the front point of the same is elevated above the lowest parts of the longitudinal edges of the scoop, as shown in Figs. 1 and 3. The opposite longitudinal edges of the scoop are sharpened from a point beginning adjacent to the rear end of the scoop and extending forwardly continuously to the pointed front end of the same, this sharpening being preferably effected by grinding which produces bevels 14, 15 arranged on the upper and lower sides of the scoop and converging outwardly to a knife edge, as shown in Fig. 7.

A scoop or bowl of this construction permits the ball of the thumb of the operator to be engaged with the concave side of the scoop and protected against abrasion or becoming sore and still permitting the necessary pressure to be applied to the implement while using the sides of the same for paring fruits and vegetables and the point to be employed for pitting or performing similar operations on like material.

The shank of the implement is also constructed of sheet metal and has the form of a tube which projects lengthwise from the rear end of the scoop and is provided on its underside with a longitudinal slit 16. This tubular shank is provided on those parts of the underside of the tubular shank on opposite sides of its slit with forwardly projecting lips 17 which are bent upwardly and engage with the underside of the adjacent convex rear part of the scoop, as shown in Figs. 1, 2, and 4, thereby reinforcing or bracing the connection between the scoop and shank and preventing breaking of the implement at this location under normal usage.

The scoop, shank and bracing or reinforcing lips are made integrally, by any suitable means, from a blank similar to that shown in Fig. 8.

The handle of the implement is preferably constructed of wood or similar material and the same is provided at its front end with a longitudinal socket 18 into which the shank is driven so as to produce a tight friction fit therebetween. In order to positively prevent the shank from turning in the socket of the handle the latter is provided with an anchoring projection on its periphery which is embedded in the bore of the socket in the handle so as to positively interlock the handle and shank and prevent relative rotation of the same which otherwise might loosen the joint between the handle and shank and eventually permit separation of the same.

The preferred means for accomplishing this purpose consists in so forming the longitudinal edge portions 19, 19 of the shank on opposite sides of its slit 16 so that these parts are arranged tangentially relative to the axis of the shank and converge outwardly toward its periphery and engage with shoulders 20 on opposite sides of a stop fin or rib 21 arranged lengthwise in the bore of the socket in the handle. This socket is originally of cylindrical form and the shank is pear-shaped in cross section but upon driving the tubular shank into the socket the laterally projecting edge portions 19 of the shank plow longitudinal grooves in the bore of the socket and the material thus displaced to produce these grooves forms the stop fin 21 which projects inwardly into the slit between the edge portions 19 of the shank and thus prevents the shank from turning on the handle.

The front ends of the longitudinal edge portions of the shank are also folded closely against the convex underside of the rear part of the scoop, as shown at 22 in Fig. 5, thereby further strengthening the joint between the shank and scoop and preventing breakage of the implement at this place while in use.

To prevent the handle from splitting around the socket therein a metal ferrule is provided which has a cylindrical body 23 surrounding the reduced front end of the handle and secured against displacement thereon by punch marks 24 placed either at the sides of the body, as shown in Figs. 1 and 3, or at the top and bottom thereof, as shown in Fig. 6, and a flange 25 projecting inwardly from the front end of the ferrule body and engaging with the front end of the handle.

I claim as my invention:—

A fruit and vegetable pitter and parer comprising a downwardly dished scoop, a tubular shank projecting lengthwise from the rear end of the scoop and having a longitudinal split on its underside, the parts of the shank on opposite sides of the split being tangent relative to the axis of the shank and converging outwardly toward the periphery of the shank so that the same is pear-shaped in cross section, a wooden handle having a socket into which said shank is driven to engage frictionally therewith and the tangent parts of said shank being embedded in the bore of said socket, and said socket being provided with a longitudinal fin, the opposite sides of which form shoulders for engagement with the outer edges of said tangent parts of the shank and preventing the latter from turning in the handle.

LAWRENCE W. DAENBA.